UNITED STATES PATENT OFFICE.

CHARLES GOODYEAR, OF NEW HAVEN, CONNECTICUT.

IMPROVEMENT IN INDIA-RUBBER FABRICS.

Specification forming part of Letters Patent No. 4,099, dated July 5, 1845.

*To all whom it may concern:*

Be it known that I, CHARLES GOODYEAR, of the city and county of New Haven, in the State of Connecticut, have invented a new and useful Water-Proof Manufacture Composed of two Elastic Substances, of which the following is a full and exact description:

My new fabric or manufacture is composed of what is termed "stocking-knit cloth" (or cloth woven in a similar manner to articles of hosiery) and caoutchouc applied and cemented to its entire surface or surfaces, or of two or more layers of such stocking-knit cloth having one or more sheets or layers of caoutchouc interposed between and connected or made to adhere to them. The peculiar elasticity of the knit material, by which it may be stretched in any or all directions, renders it peculiarly applicable in the fabrication of water-proof articles, or those whose properties of resistance to the penetration of water, air, or gases depend upon the caoutchouc or elastic, water, air, or gas-proof composition applied to them.

For water-proof shoes, gaiter-boots, coats, and many other articles whose beauty of appearance as well as utility depend in a great degree upon their well fitting the parts of the body, or that to which they are applied, and which require elasticity in various directions in order to be easily put on and removed, my improvement will be found specially useful, and as obviating many of the difficulties attendant upon the use and sale of such articles.

Other very great advantages resulting from the use of the stocking-knit fabric are warmth and ventilation, the latter of which is greatly facilitated when the article is stretched so as to distend and separate the stitches, as will be perceived by an inspection and extension thereof.

I claim—

The above new manufacture, or the combination of the two elastic materials, stocking-knit fabric and caoutchouc, whether the latter be applied to the exterior surface or surfaces of said fabric or between two or more pieces or layers of said fabric or cloth, substantially as set forth.

In testimony whereof I have hereto set my signature this 16th day of June, A. D. 1845.

CHARLES GOODYEAR.

Witnesses:
    R. H. EDDY,
    GEO. H. BAILEY.